United States Patent [19]
Chu

[11] Patent Number: 5,895,499
[45] Date of Patent: Apr. 20, 1999

[54] CROSS-DOMAIN DATA TRANSFER USING DEFERRED PAGE REMAPPING

[75] Inventor: Hsiao-keng J. Chu, Palo Alto, Calif.

[73] Assignee: Sun Microsystems, Inc., Palo Alto, Calif.

[21] Appl. No.: 08/497,816

[22] Filed: Jul. 3, 1995

[51] Int. Cl.⁶ .................................................. G06F 15/163
[52] U.S. Cl. .......................... 711/202; 711/203; 395/680
[58] Field of Search ................. 395/400, 200.01–200.08, 395/680, 681–685; 711/202, 203; 364/200

[56] References Cited

U.S. PATENT DOCUMENTS

| | | | |
|---|---|---|---|
| 4,758,951 | 7/1988 | Sznyter | 364/200 |
| 5,088,031 | 2/1992 | Takasaki et al. | 395/400 |
| 5,179,675 | 1/1993 | Cole et al. | 395/400 |
| 5,390,310 | 2/1995 | Welland | 395/400 |
| 5,430,842 | 7/1995 | Thompson et al. | 395/200 |
| 5,522,045 | 5/1996 | Sandberg | 395/200.08 |

OTHER PUBLICATIONS

Barrera, Joseph, "A Fast Mach Network IPC Implementation", Proc USENIX 2$^{nd}$ Mach Symposium, pp. 1–12, Nov. 91.

Robinson et al, "Domain–based access control for distributed computing systems", Software Engineering pp. 161–170 Sep. '88.

Boykin et al, Programming under Mach, Chap 4 pp. 99–148, Sep. 93.

S.-Y. Tzou and D.P. Anderson, "The Performance of Message–passing using Restricted Virtual Memory Remapping", Software–Practice and Experience, vol. 21(3), Mar. 1991, pp. 251–267.

Peter Druschel and Larry L. Peterson, "Fbufs: A High–Bandwidth Cross–Domain Transfer Facility", Proceedings of the Fourteenth ACM Symposium on Operating Systems Principles, Dec. 1993.

James P.G. Sterbenz and Gurudatta M. Parulkar, "AXON: A High Speed Communication Architecture for Distributed Applications," Proceedings of IEEE INFOCOM '90, Jun., 1990.

Primary Examiner—Majid A. Banankhah
Assistant Examiner—Patricia Caldwell
Attorney, Agent, or Firm—Beyer & Weaver, LLP

[57] ABSTRACT

A cross-domain data transfer technique is disclosed in which page remapping operations are eliminated in situations where physical memory addresses can be passed across domains. By passing physical memory addresses across domains instead of virtual memory addresses, the page remapping operations necessarily associated with passing virtual memory addresses across domains can be avoided in many cases. With the receipt of data across domains, page remapping operations are able to be deferred until the data is received in a domain that needs to touch the data. In certain cases, the transfer of data can be completed without ever having to map in the data to the receiving domain's address space. With the transmission of data across domains, where possible the pages are borrowed in their physical form. The invention can be embodied in many ways, including system, apparatus or method forms.

17 Claims, 7 Drawing Sheets

CROSS-DOMAIN DATA TRANSFER USING DEFERRED PAGE REMAPPING

BACKGROUND OF THE INVENTION

1. Field of the Invention

The present invention relates to data transfer across domains, and more particularly, to data transfer across a number of different protection domains using page remapping.

2. Description of the Related Art

Operating systems that utilize different protection domains require a data transfer scheme to transfer data from one domain (sender or source) to another domain (receiver or sink). The operating system is responsible for not only the transfer of the data from one domain to another but also insuring that the protection or security information is updated so that processes running in a certain domain will not interfere with processes running in other domains.

Through use of multiprogramming, modern computer systems are able to execute several processes at essentially the same time. With multiprogramming, the computer (e.g., CPU) and the memory are time shared amongst the several users (i.e., processes), thereby giving the illusion that all users have their own machine. Computers which use multiprogramming usually also provide for a sharing of code and data between processes. Such sharing allows communication between the processes and can reduce the number of copies of identical information being stored.

Despite the ability to share code and data between processes, often times data must be transferred from one domain to another domain. Simply copying the data from the sender domain to the receiver domain is unacceptable because it is so inefficient and burdensome to the computer and the memory that they become a bottleneck. As networks become faster, this bottleneck worsens because when data is copied, every word passes through the computer and the memory.

Prior attempts to minimize data transfer overhead associated with the transfer of data between different protection domains in an operating system have typically used virtual memory remapping techniques. Virtual memory remapping techniques give the appearance of data transfer by remapping data pages from the sender domain to the receiver domain. See, e.g., S.-Y. Tzou and D. P. Anderson, "The Performance of Message-passing using Restricted Virtual Memory Remapping," *Software-Practice and Experience*, Vol. 21, March 1991. Here, instead of copying the data across domains, virtual memory remapping techniques are used to update page table entries in a memory-management unit (MMU).

However, in reality, simulating the data transfer by conventional virtual memory remapping techniques requires a lot more work than simply updating page table entries within the MMU. Typically, the operating system has to manage buffers at the source and destination, update virtual mappings at several levels, and perform translation-look-aside buffer (TLB) consistency actions. As a result, the total work involved with remapping can be expensive.

Recently, proposals have been made which attempt to cut down the number of page remapping operations required for data transfer across different domains. See, e.g., Peter Druschel and Larry L. Peterson, "Fbufs: A High-Bandwidth Cross-Domain Transfer Function," *Proceedings of the Fourteenth ACM Symposium on Operating Systems Principals*, December 1993. However, these recent proposals are unsatisfactory because they require deviation from existing UNIX networking I/O interface, require special hardware support and/or compromise data protection or security.

Thus, there is a need for a cross-domain data transfer technique which does not require extensive page remapping operations, yet maintains data protection and security and works with existing network interfaces without the need for special hardware support.

SUMMARY OF THE INVENTION

Broadly speaking, the invention is a cross-domain data transfer technique in which page remapping operations are eliminated in situations where physical memory addresses can be passed across domains. By passing physical memory addresses across domains instead of virtual memory addresses, the page remapping operations necessarily associated with passing virtual memory addresses across domains can be avoided in many cases.

There are two primary aspects to the invention. The first aspect pertains to the receipt of data across domains, and the second aspect pertains to the transmission of data across domains. With the receipt of data across domains, the remapping operations are able to be deferred until the data is received in a domain that needs to touch the data. In certain cases, the transfer of data can be completed without ever having to map in the data to the receiving domain's address space. With the transmission of data across domains, where possible the pages are borrowed in their physical form. The invention can be embodied in many ways, including system, apparatus, method or computer program product forms.

As a computer system, an embodiment of the invention includes a network adapter that connects to a network, the network adapter including circuitry for performing data checksum operations; a computer and an operating system arranged to support multiple processes and multiple domains; a main memory having at least a portion thereof arranged in pages; and a virtual memory management unit for managing reads and writes to the memory using page mapping information. Pages are fixed size blocks or chunks of memory. The operating system controls ownership of the pages in the memory using page ownership information. Further, the computer system enables the receipt of a physical page of data transferred between domains by reassigning ownership of the physical page within the page ownership information without updating the page mapping information associated with the virtual memory management unit until the domain obtaining ownership needs to read the data. Additionally, the computer system may further enables the transmission of a physical page of data across domains by borrowing the physical page.

As a method associated with the first aspect of the invention, the invention operates within a multitasking computer system having an operating system supporting multiple domains and virtual memory to transfers a block of data associated with a first domain to a second domain. The method includes the steps of: receiving a request at a first domain from a second domain for a physical block of data residing on a portion of physical memory assigned to the first domain; and flipping ownership of the physical block of data requested from the first domain to the second domain with a physical block of data residing on a portion of physical memory assigned to the second domain, thereby transferring the physical blocks of data between the first and second domains without having to map in the physical blocks into the virtual memory. Preferably, the operating system includes an operating system kernal, and the operating system kernal performs the flipping. Also, as an example, the first domain may be a network domain and the second domain may be a kernal domain.

As a method associated with the second aspect of the invention, the invention operates within a multitasking computer system having an operating system supporting multiple domains and virtual memory to transfers a block of data associated with a second domain to a first domain. The method includes the steps of: receiving a write request to write data residing on a physical page of memory associated with the first domain to the first domain; borrowing, by the first domain, the physical page from the second domain for use by the second domain; and returning the borrowed physical page to the second domain after the first domain has finished using the borrowed physical page. The method may also include the steps of: locking ownership of the borrowed page while the physical page is being borrowed, and providing read-only access to the borrowed page from the second domain while the physical page is being borrowed. Again, as an example, the first domain may be a network domain and the second domain may be a kernal domain. domain.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1 and 3–8. However, those skilled in the art will readily appreciate that the detailed description given herein with respect to these figures is for explanatory purposes as the invention extends beyond these limited embodiments.

The invention pertains to a cross-domain data transfer technique which defers page remapping operations until the data is received in a domain which touches the data. In certain situations, the page remapping operations may be completely deferred, that is, never performed. By deferring page remapping operations associated with many across domain data transfers, the burden on the operating system to perform page remapping operations during cross-domain data transfers is substantially alleviated. Hence, the invention provides for more efficient data transfer across domains than conventionally possible. A domain is said to "touch" the data when the domain accesses (i.e., reads or writes) the data.

With network input/output (I/O) data transfers, it is conventionally required that operating system software perform a data checksum computation for data incoming over a network. The data checksum computation is a well known approach used to verify integrity of incoming data. However, because modern communication networks support high-speed data transfer, requiring the operating system to perform the data checksum computation forces the operating system into a bottleneck situation. This bottleneck situation makes conventional approaches of performing data checksum computations problematic. As a result, manufacturers of network adapters or network cards are beginning to provide hardware on the network adapters (or network cards), to perform the checksum computations. Consequently, the operating system no longer has to touch (e.g., read) the incoming data for the purpose of performing a checksum computation.

Since data checksum calculations will be done by the network adapters, the operating system (or network protocol) software no longer needs to touch the data pages being transferred. Therefore, data pages in many cases may simply flow through certain domains (e.g., the kernel domain) without being mapped to the virtual memory system.

The invention is particularly useful when transferring data from/to a user domain to/from a network because such transfers pass the data through the kernal domain on the way to/from the network. With the invention, the operating system can avoid performing page remapping when transferring data from a user domain to the network because neither the kernal domain (through which the data passes) not the network need touch the data using the virtual memory system. Although data being transferred need not be touched in many cases, network protocol will still touch (i.e., read) the header portion of the packets for network routing purposes.

The processing overhead associated with network protocol software can be divided into two basic categories: data touching overhead and non-data touching overhead. Data touching overhead includes data transfer and data checksum computations. Non-data touching overhead includes protocol-specific processing, network buffer management, and various operating system overhead. In order to reduce the non-data touching overhead, large packets are sent. However, the network typically imposes an upper bound on packet size. The upper bound is called maximum transmission unit (MTU). With modern generation networks, such as ATM and FDDI, the MTUs are becoming larger. As a result, the overhead from data touching operations is becoming a significant portion of the total cost to move data across networks. Therefore, by reducing data touching overhead, the invention improves throughput of data transfer across a network.

The invention can be implemented with conventional UNIX networking I/O interfaces, conventional virtual memory architectures, and conventional network drivers. On the transmit side, the invention eliminates kernel domain remapping work, and requires only a minor software change to drivers to take physical pages, instead of virtual memory. On the receive side, drivers do need to switch to use a physical memory allocator. The physical memory allocator is used to allocate pages of physical memory. However, the receive side will still use a virtual memory allocator for situations in which virtual memory is needed. The organization and operation of memory allocators are well known in the art.

The savings provided by the invention are substantially greater than conventional page remapping. Typically, the invention reduces the amount of remapping and page identity-flipping to half of what was previously required.

Figure 1:
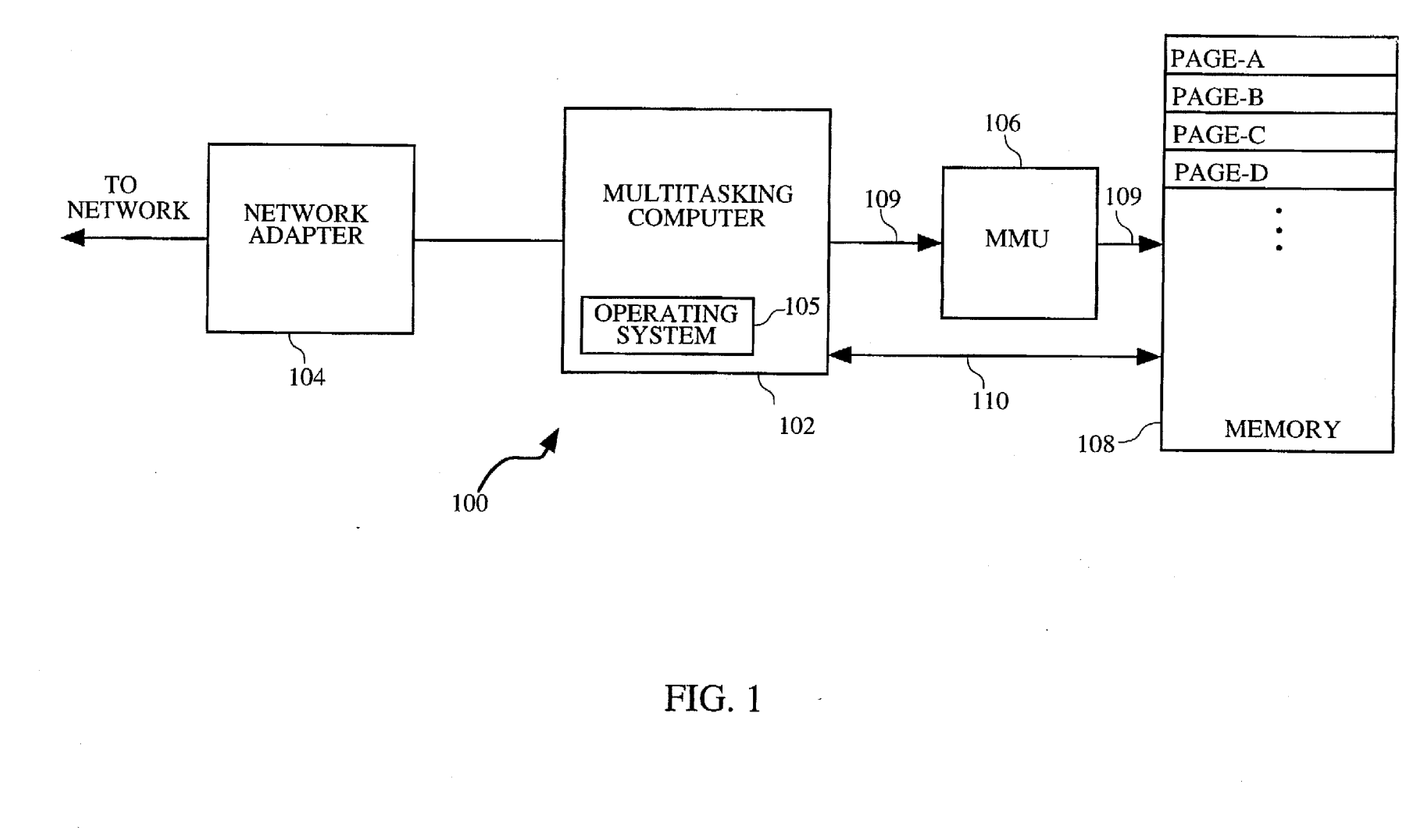
FIG. 1 is a simplified block diagram of a computer system in accordance with an embodiment of the invention.

FIG. 1 is a simplified block diagram of a computer system 100 in accordance with an embodiment of the invention. The computer system 100 includes a multitasking computer 102 coupled to a network adapter (interface) 104. The multitasking computer 102 can be any computer having an architecture and an operating system 105 that support virtual memory, multiple processes and multiple protection domains. Many commercially available computers can be utilized as the multitasking computer 102, one of which is the SparcStation 20s by Sun Microsystems, Inc. of Mountain View, Calif. UNIX, for example, is suitable for the operating system 105. The network adapter 104 is connected to a network (not shown) for sending and receiving data using a network protocol such as FDDI, ATM, and the like. The network adapter 104, among other tasks which are well known in the art, performs data checksum operations on the data being supplied to or received from the network. One such commercially available network adapter with such capabilities is BATMAN ATM Card by Sun Microsystems, Inc. The sending and receiving of data over a network (known as network I/O) is asynchronous and for that reason more burdensome on the computer system 100 than synchronous events such as disk I/O. The network may be local or wide-area. An example of a local network is ethernet, and an example of a wide-area network is Internet.

The multitasking computer 102 is also connected to a memory management unit (MMU) 106 and a memory 108. The MMU 106 is part of a virtual memory system and controls the data management operations (including read and write) of the multitasking computer 102 with respect to the data memory 108. The functions performed by the MMU 106 include the translation of virtual memory addresses provided by the multitasking computer 102 into physical page addresses provided by the memory 108. As shown in FIG. 1, the memory 108 is divided or partitioned into pages (e.g., PAGE_A, PAGE_B, PAGE_C, PAGE_D). The pages of the memory 108 are physical pages, whereas the pages utilized by the multitasking computer 102 are typically, but not always, virtual memory pages. In this embodiment, the pages are of fixed and equal sizes. The multitasking computer 102, the MMU 106 and the memory 108 are interconnected with address bus 109, 109' and data bus 110.

Since the computer 102 supports multitasking, the computer system 100 supports multiple processes by time sharing the computer and memory resources between the processes. Typically, each process is associated with a different domain and the domains are protected from one another. Hence, although the multitasking computer 102 can execute multiple processes by time sharing the computer and memory resources, the operating system 105 ensures that the processes do not interfere with each others' computations.

To implement the sharing of the memory 108 amongst the differing domains, a virtual memory system is utilized. Consequently, when the multitasking computer 102 is running multiple processes, each process will have its own address space within virtual memory. Hence, virtual memory is a means by which many processes can share a smaller amount of physical memory. Virtual memory does this by dividing the physical memory into blocks or pages and then allocating the blocks or pages to the different processes or domains. Inherent in such an approach is a protection scheme that restricts access of the process to only the pages or blocks associated with that process.

The invention primarily relates to operations performed by the operating system 105 during cross-domain data transfers. The description provided below explains these operation in sufficient detail to enable those in the art to implement the invention in numerous embodiments. However, before discussing the details of the invention, a discussion of conventional virtual memory page remapping is provided.

Figure 2:
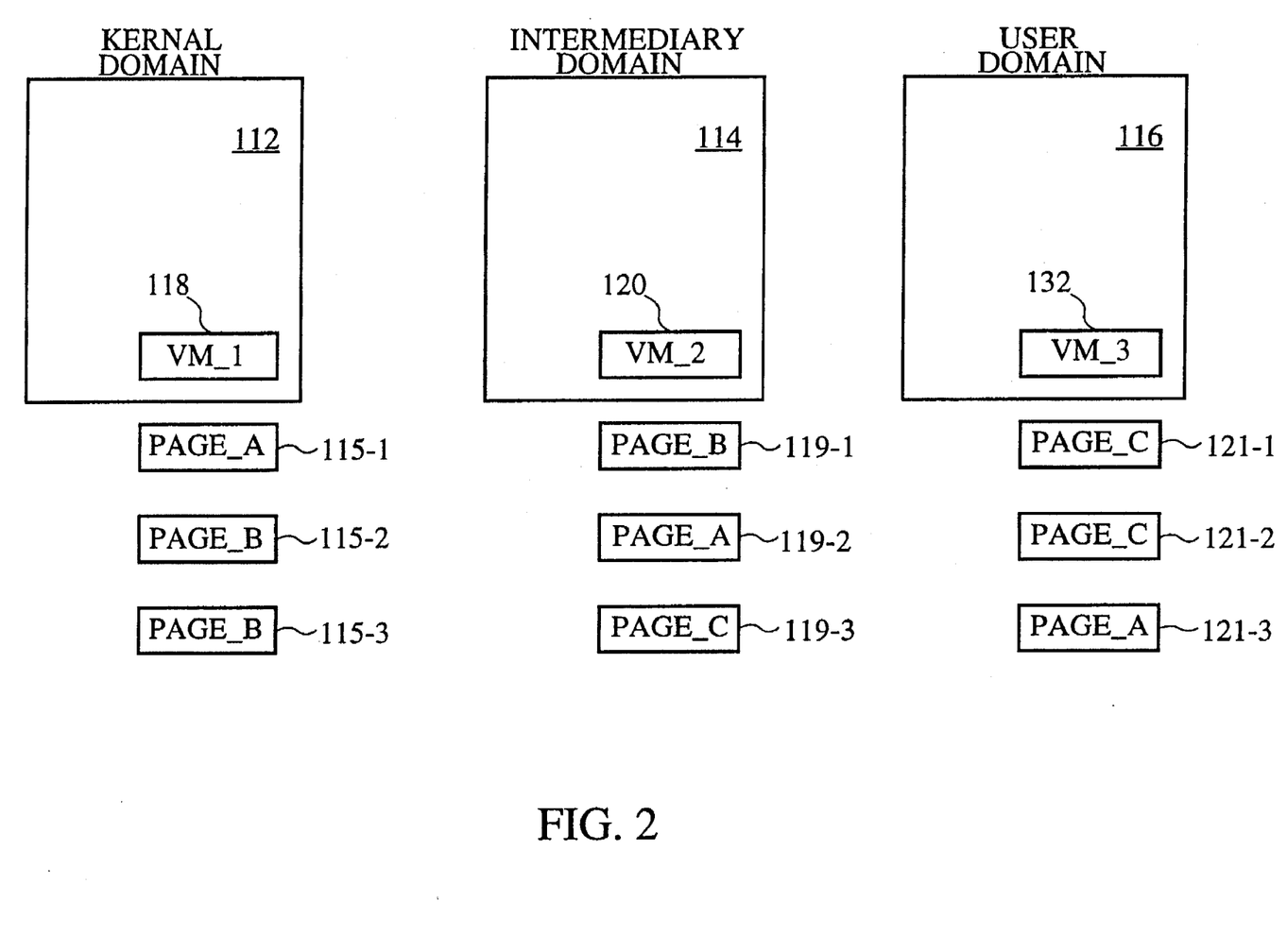
FIG. 2 is a diagram illustrating a conventional virtual memory page remapping across different protection domains.

FIG. 2 is a diagram illustrating a conventional virtual memory page remapping across different protection domains. The protection domains illustrated in FIG. 2 are a kernel domain 112, an intermediary domain 114, and a user domain 116. Previously, assume that the network adapter 104 received data over the network, performed data checksum operations, and stored the data in the kernel domain 112. In this example, the kernel domain 112 serves as the sender and the user domain 116 serves as the receiver. The intermediary domain 114 serves as a pipe or link between the sender and the receiver. Each domain typically executes its own process and has a portion of the memory 108 available for its exclusive use.

In FIG. 2, the kernel domain 112 has associated with it a virtual memory area (VM_1) 118, the intermediary domain 114 has associated with it a virtual memory area (VM_2) 120, and the user domain 116 has associated with it a virtual memory area (VM_3) 122. The virtual memory areas 118, 120 and 122 are buffers (virtual memory buffers) which are allocated to their respective domains. The virtual memory areas 118, 120 and 122 are pointers associated with specific physical pages of the memory 108.

To illustrate conventional virtual memory address remapping in FIG. 2, it is assumed initially that the virtual memory area 118 of the kernel domain 112 maps to PAGE_A 115-1, the virtual memory area 120 maps to PAGE_B 119-1, and the virtual memory area 122 maps to PAGE_C 121-1. Hence, the virtual memory areas associated with the different domains corresponds to particular physical pages in the memory 108. However, it should be understood that the virtual memory areas 118, 120 and 122 within the different domains can refer to different size blocks of physical memory. The blocks can correspond to less than a page or more than a page, or can correspond to more than one page.

To transfer the data held in the virtual memory area 118 of the kernel domain 112 to the virtual memory area 122 of the user domain 116 according to a virtual memory remapping operation, the operating system must first transfer the data to the virtual memory area 120 of the intermediary domain 114. This operation remaps the virtual memory area 118 and the virtual memory area 120 such that thereafter the MMU 106 causes the virtual memory area 118 to map to PAGE_B 115-2 and causes the virtual memory area 120 to map to PAGE_A 119-2. So far, the user domain 116 has not received the data being transferred so the virtual memory area 122 still maps to PAGE_C 121-2. Next, to complete the data transfer from the kernel domain 112 to the user domain 116, another remapping operation occurs. This time, the virtual memory area 120 maps to PAGE_C 119-3 and the virtual memory area 122 maps to the PAGE_A 121-3. The virtual memory area 118 continues to map to PAGE_B 115-3. Hence, by altering the page entry tables within the MMU 106 as illustrated in FIG. 2, the data from the kernel domain can be transferred across different protection domains by repeatedly remapping the virtual memory pages which correspond to the physical protection domains. Hence, by using conventional virtual memory address remapping, data can be transferred across domains without having to copy the data. Nevertheless, this conventional approach is unsatisfactory for the reasons given above.

Now that conventional virtual memory page remapping has been described, the operation of the invention is explained in greater detail with reference to FIGS. 3–8.

Figure 3:
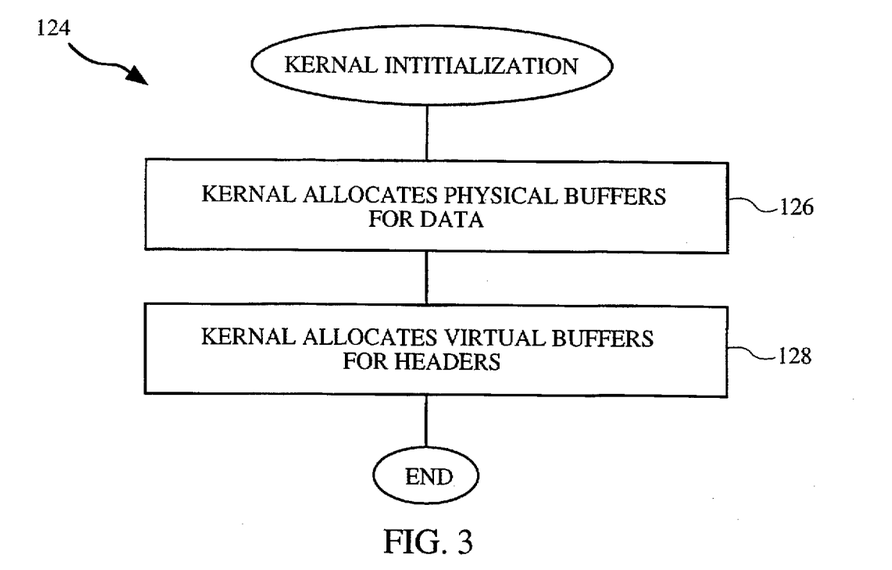
FIG. 3 is a flow chart of kernel initialization processing according to the invention.

FIG. 3 is a flow chart of a kernel initialization process 124 according to the invention. The kernel is part of the operating system 105 and one of its many tasks is to allocate buffers to the various domains. Hence, the kernel initialization process 124 begins with the kernel allocating 126 physical buffers for data. Next, the kernel allocates 128 virtual buffers for headers. As is well known, the header and data comprise a network packet. The header includes network protocol information which is primarily used for network routing. By using the physical buffers for data, invention will yield a performance advantage over conventional techniques in which both headers and data were allocated to virtual buffers. The performance advantage obtained by the invention will become more apparent below. If it turns out a virtual address is needed for data because software (e.g., networking protocol software) needs to access the data, the originally allocated physical buffer can be mapped into a virtual address.

Figure 4:
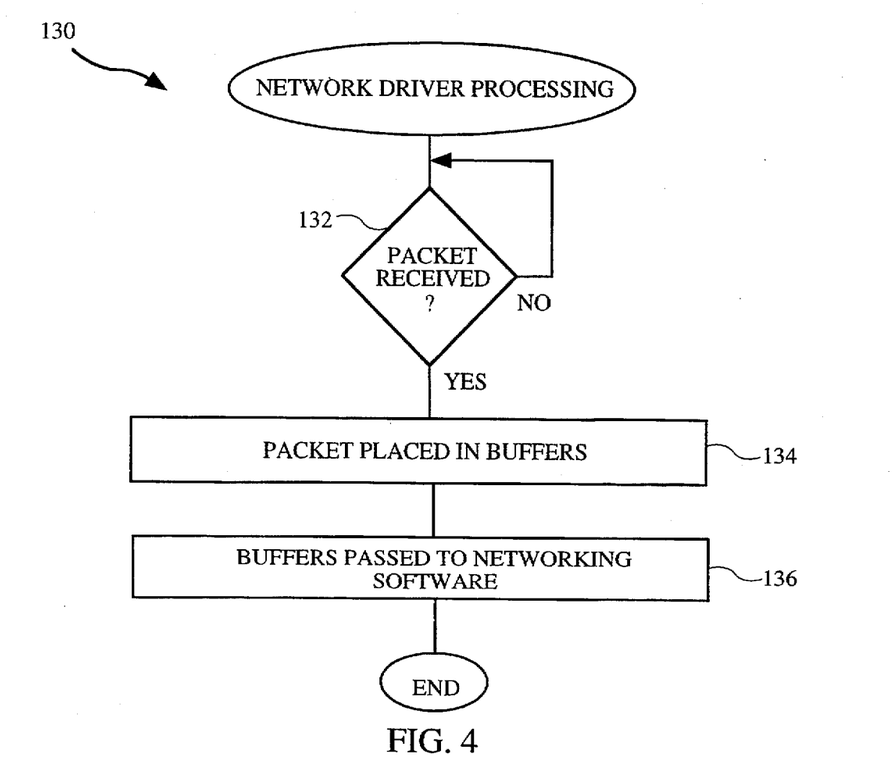
FIG. 4 is a flow chart of network driver processing in accordance with the invention.

FIG. 4 is a flow chart of network driver processing 130 in accordance with the invention. Data coming in from the network is received by the network adapter 104 which initiates the network driver processing 130. The data coming in is typically arranged in packets, each packet having a header and data. The network driver processing 130 begins by determining 132 whether a packet has been received over the network. If no packet has been received, the network driver processing 130 waits until one is received. Once a packet is received, the packet is placed 134 in buffers. The header is placed in a virtual buffer and the data is placed in one or more physical buffers. The buffers are then passed 136 to networking protocol software. The networking protocol software performs the networking protocol processing and is typically part of the operating system kernal.

Figure 5:
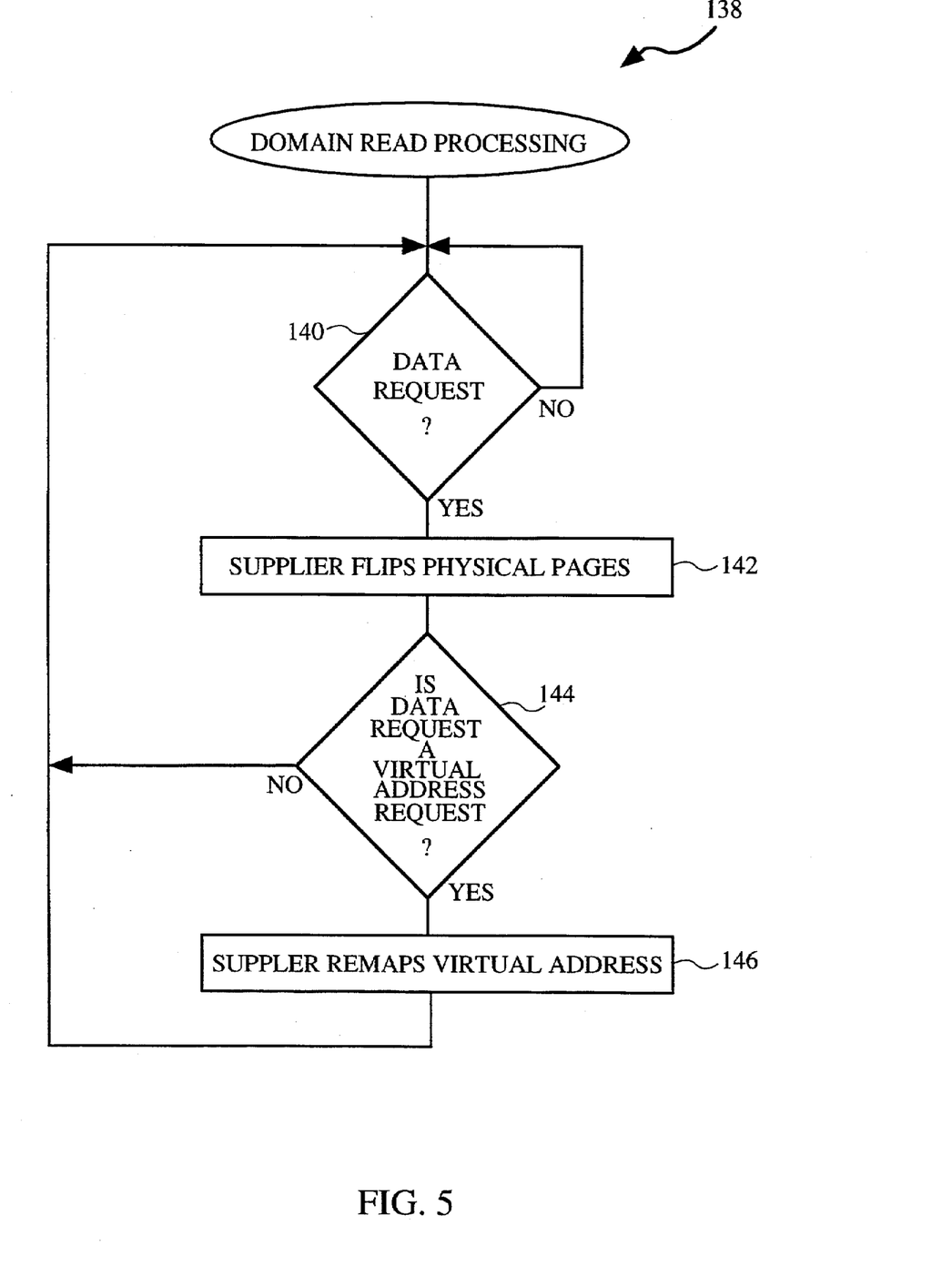
FIG. 5 is a flow chart of domain read processing in accordance with the invention.

FIG. 5 is a flow chart of domain read processing 138 in accordance with the invention. The domain read processing 138 is associated with a read request (a type of data transfer) from a consumer (receiver) to a supplier (sender). Although any cross-domain data transfer will do, as an example, the supplier may be the kernel domain and the consumer may be a user domain. The domain processing 138 begins by determining 140 whether a data request has been initiated by the consumer. If no data request has been received, the domain processing 138 waits until a data request is received. Once a data request has been received by the domain, software (e.g., operating system) within the supplier (sending domain) flips 142 the physical pages. The flipping 142 of the physical pages has the effect of changing ownership of the physical pages. For a domain to utilize a particular page, that domain must "own" the page. Hence, by changing the ownership of the physical pages, pages are able to be utilized by different domains. For example, if the supplier owns PAGE_A and the receiver owns PAGE_B, then once flipped 142, the supplier will own PAGE_B and the receiver will own PAGE_A, but no remapping of the virtual memory has taken place. The flipping 142 is achieved by updating virtual memory data structures (e.g., ownership information and process link list information) within the operating system kernal. Next, a decision 144 is made based on whether the data request is a virtual address request.

If the data request is not a virtual address request, it is by default a physical pages memory request. It is up to the software making the data request to decide what form of memory it needs: physical memory or virtual memory. If the software needs to touch the data, it must request the virtual form. On the other hand, if the software does not need to touch the data, the request should use the physical form. In the case when the data request is a physical pages memory request, the virtual memory remapping operations need not be performed because the data requester will not touch the data. As a result, the physical page itself is transferred simply by changing the data structures as was done in block 142. It is enough in this case that the data structures (e.g., ownership) of the physical pages are changed because (by definition) no virtual memory operations are needed on the data page. Hence, after the flipping 142, the consumer receives the transferred page in physical form. On the other hand, if the data request is a virtual address request, then the supplier remaps 146 the virtual addresses because in this case, the consumer (receiving domain) intends to access the data. Namely, the virtual memory must be remapped in this case because to access the data page will require use of virtual addresses.

Figure 6:
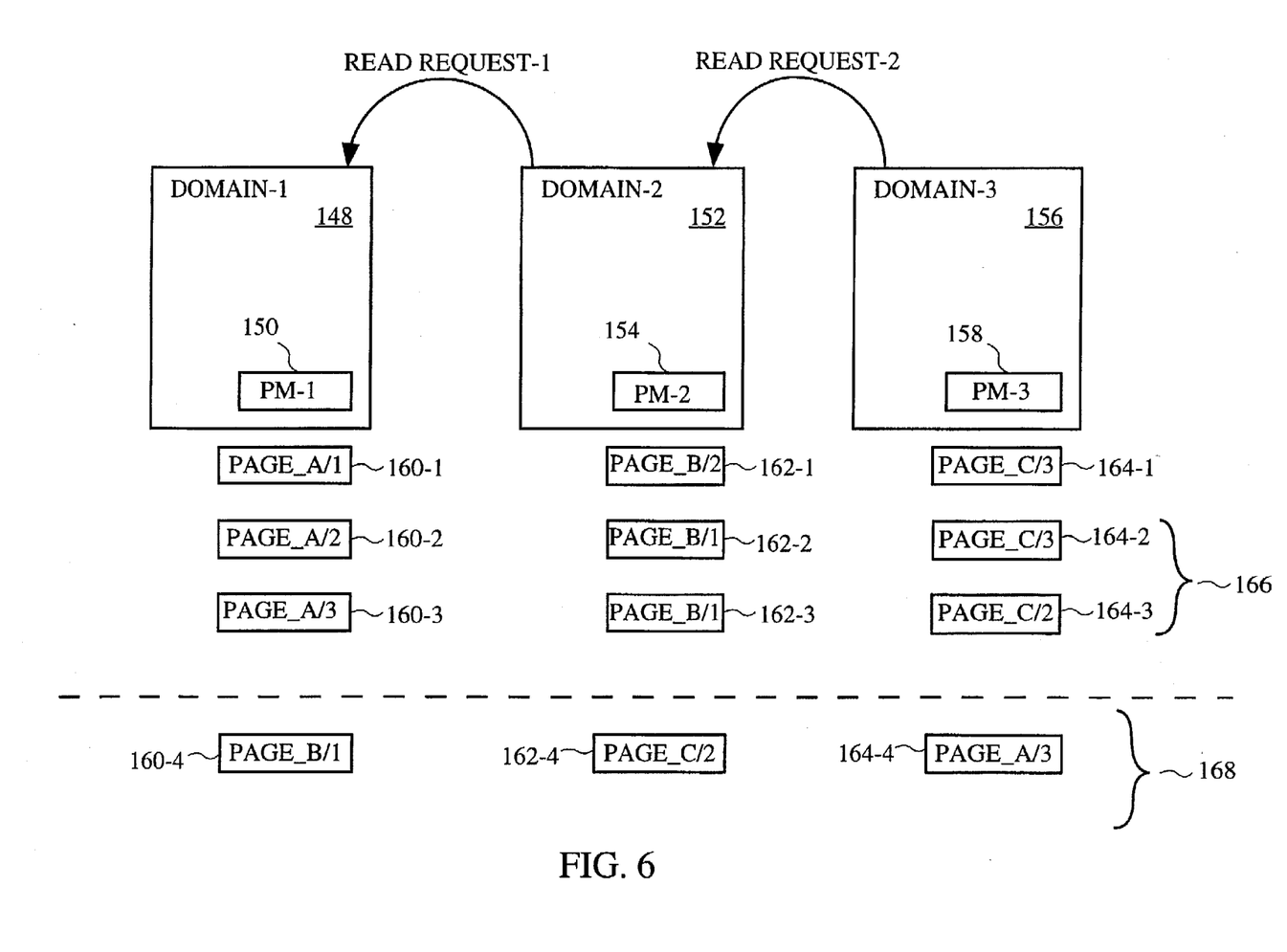
FIG. 6 is a diagram illustrating an example of the domain read processing according to the invention.

FIG. 6 is a diagram illustrating an example of the domain read processing 138. In this illustrative example, certain processes of the multitasking computer 102 are executed in domain-1 148 using physical memory area 150, domain-2 152 using physical memory area 154, and domain-3 156 using physical memory area 158. Initially, the physical memory area 150 associated with domain-1 148 corresponds to PAGE_A/1 160-1, the physical memory area 154 associated with domain-2 152 corresponds to PAGE_B/2 162-1, and the physical memory associated with domain-3 156 corresponds to PAGE_C/3 164-1. The notation PAGE_A/1 refers to the physical page A within memory 108 and its ownership being indicated by the domain number following the slash symbol "/", in this case domain-1 148. Assume that domain-2 152 issues a read data request (read request-1) to domain-1 148. The read data request (read request-1) requests the transfer of data associated with domain-1 148 to domain-2 152. The domain read processing 138 (typically within the domain-2 152) performs the flipping 142 operation. This completes the domain read processing 138 when the data request is a physical page memory request. The flipping 142 is shown in FIG. 6, wherein the physical memory area 150 associated with domain-1 148 now (in the second row under domain-1) corresponds to PAGE_A/2 160-2 and the physical memory area 154 associated with domain-2 152 now (in the second row under domain-2) corresponds to PAGE_B/1 162-2. Hence, comparing the first two rows under domain-1 148 and domain-2 152, it is shown that PAGE_A and PAGE_B have not been remapped to different domains using the virtual memory system, but the ownership of these pages has been changed. Consequently, domain-1 148 can now control PAGE_B but can no longer control PAGE_A, and domain-2 152 can now control PAGE_A but can no longer control PAGE_B. In FIG. 6, the third column underneath the domain-1 148, domain-2 152 and domain-3 156 shows the results after a second read request (read request-2) is issued by domain-3

156 to domain-2 152 requesting the transfer of the data associated with domain-2 152 to domain-3 156. As before, the pages are flipped to change their ownership, but no virtual memory remapping occurs. Hence, reference number 154 shown in FIG. 6 refers to the flipping operations 142 carried out to implement the cross-domain transfer of data from domain-1 148, through domain-2 152, and to domain-3 156.

FIG. 6 also illustrates an example in which the data request is a virtual address request in which the remapping 146 operation is carried out. In FIG. 6, the remapping 146 is associated with the fourth row under the domain-1 148, domain-2 152 and domain-3 156, indicated by reference numeral 158. As shown, after the remapping operations 166, the physical memory associated with domain-1 148 is PAGE_B 160-4, the physical memory associated with domain-2 152 is PAGE_C 162-4, and the physical memory associated with domain-3 156 is PAGE_A 164-4.

The deferral of the remapping operation by the invention is also illustrated in FIG. 6. Assume that the first read request (read request-1) wanted the data belonging to domain-1 148 (e.g., a network domain) to be transferred to domain-2 152 (e.g., a kernal domain). Because domain-2 152 need not touch the data, the first read request need not perform an expensive virtual memory remapping operation; instead, the invention need only perform a flipping operation. Also assume that the second read request (read request-2) sequentially followed the first read request and requesting the data now belonging to domain-2 152 for purposes of its use in domain-3 156 (e.g., a user domain). Here, with the second read request, assume domain-3 156 intends to touch the data it receives from domain-2 152. Consequently, both the flipping 142 and the remapping 146 operations would be performed by the domain processing 138 (typically within domain-2 152). Consequently, although the data effectively traversed across two domains, only one remapping operation was required. Thus, the remapping operation associated with the first read request is viewed as being deferred. The remapping operation is deferred until the consumer or receiving domain has a need to or intends to touch the data being transferred. If the final consumer or receiving domain is able to accept a physical address because it does not touch the data, then the remapping operation is not needed at all (i.e., completely deferred). This complete deferral would include the case where data is transferred to a domain which is a disk that is able to store the data to a file using the physical address.

Figure 7:
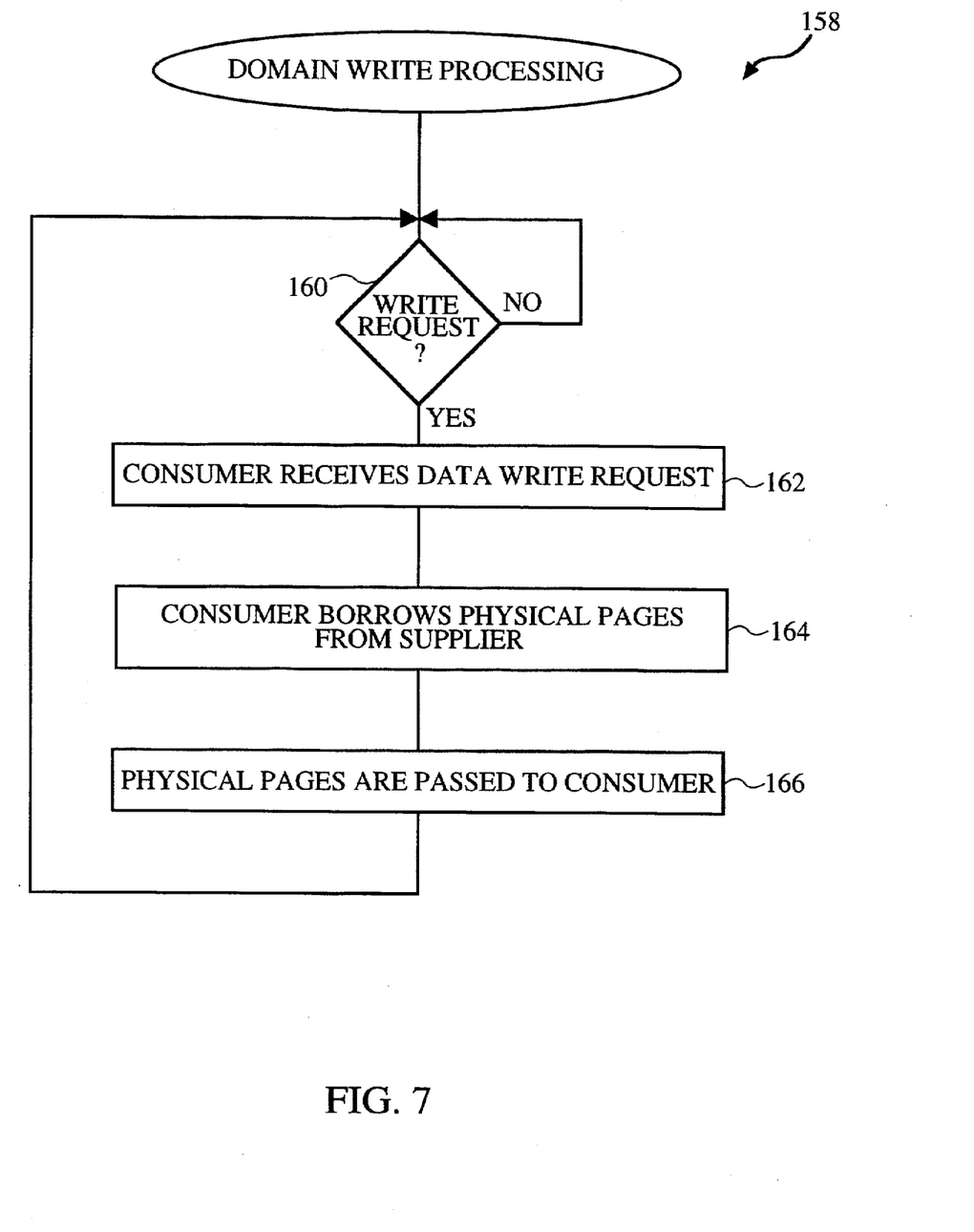
FIG. 7 is a flow chart of domain write processing in accordance with the invention.

FIG. 7 is a flow chart of domain write processing 158 in accordance with the invention. The domain write processing 158 offers an even greater performance advantage over the conventional processing than does the domain read processing 138 because in many cases the data structures (e.g., ownership) need not be altered. The domain write processing 158 begins by determining 160 whether a write request has been received. If a write request has not yet been received, the domain write processing 158 waits until a write request is received. Once a write request is received, a consumer receives 162 the data write request. Next, the consumer borrows 164 the physical pages from the supplier (the domain issuing the write request). Although the borrowing 164 does not need to change ownership of the pages as was done with read processing 138 to flip the pages, the domain write processing 158 does require that the operating system 105 "freeze" or lock the ownership of the page being borrowed. The "freeze" of the ownership prevents the borrowed page from being acquired by another domain while it is borrowed. However, while the page is being borrowed, the original owner (supplier) of the page is permitted read-only access to the page and copy-on-write (cow) protection is provided by the MMU 106. The physical pages are then passed 166 to the destination. The passing 166 of the physical pages is achieved by passing the physical address of the pages. Note that the physical page or pages borrowed are borrowed in their physical form, not their virtual form.

Although not shown in FIG. 7, for the implementation of the domain write processing 158 to be generally applicable, it also needs to be able to handle situation where the consumer cannot directly use physical addresses. In the case where the consumer (receiving domain) cannot operate directly on physical pages, the consumer must also allocate virtual address space of its domain and map in the borrowed physical page so that the consumer can access the data on the borrowed page using virtual addresses.

Figure 8:
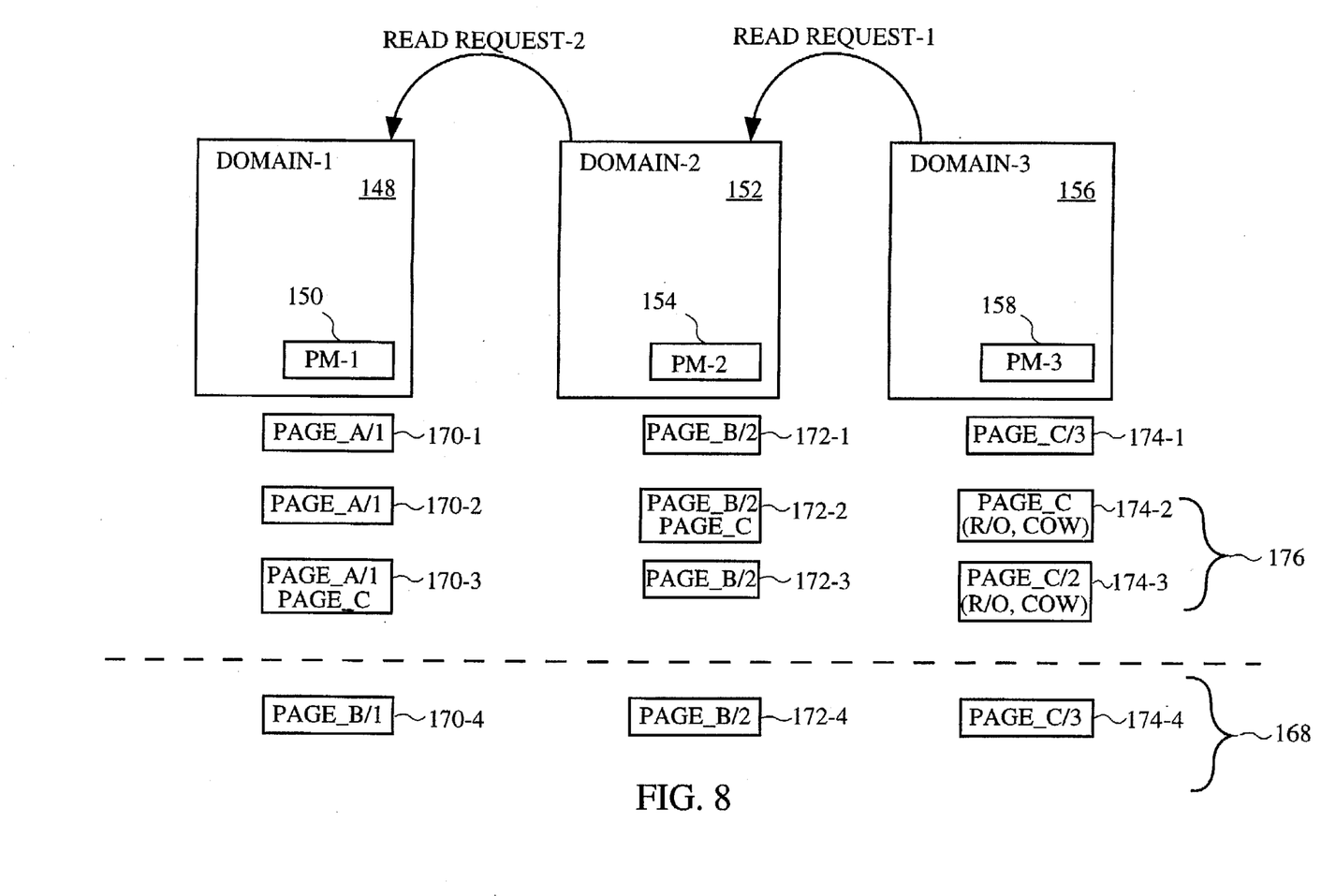
FIG. 8 is a diagram illustrating an example of the domain write processing.

FIG. 8 is a diagram illustrating an example of the domain write processing 158 using domain-1 148 (e.g., a network domain), domain-2 152 (e.g., a kernal domain) and domain-3 156 (e.g., a user domain). Assume that domain-3 156 issues a first write request (write request-1) to domain-2 152 requesting the transfer of data from domain-3 156 to domain-2 152. Also assume that initially the physical memory area 150 associated with domain-1 148 corresponds to PAGE_A/1 170-1, the physical memory area 154 associated with domain-2 170 corresponds to PAGE_B/2 172-1, and the physical memory area 158 associated with domain-3 156 corresponds to PAGE_C/3 174-1. Upon receiving the first write request, domain-2 152 borrows 164 the physical page(s) from the domain supplying the data. Here, domain-2 152 borrows PAGE_C from domain-3 156. The second row under domain-2 152 and domain-3 156 illustrate the first borrowing operation. Namely, after the first borrowing operation, the physical memory area 150 associated with domain-1 148 still corresponds to PAGE_A/1 170-2 and the physical memory area 154 associated with domain-2 152 still corresponds to PAGE_B/2 172-2, but the physical page of memory initially associated with the physical memory area 158 of domain-3 156 (PAGE_C 174-2) is now also associated with the physical memory area 154 of domain-2 152 (PAGE_C 172-2). Here, the domain-2 152 has borrowed PAGE_C from domain-3 156. However, while the page is borrowed, the ownership of the page is locked and the domain-3 156 is limited to read-only access to the page.

Assuming that the ultimate consumer or destination for the data originally associated with domain-3 156 is domain-1 148 (e.g., the network domain), a second write request (write request-2) is next carried out in the same manner. With the second write request, domain-1 148 borrows PAGE_C from domain-2 152 so that it can make use of this physical page in the memory 108. The borrowed PAGE_C is now associated with the physical memory 150 of domain-1 148, and domain-3 156 is still restricted to read-only access to PAGE_C because the page is still borrowed. As shown in FIG. 8, only the column under domain-3 156 changes in this example of the borrowing operation. Reference number 176 shown in FIG. 8 refers to the borrowing operations 176 carried out to implement the cross-domain transmission of data from domain-3 156, through domain-2 152, and to domain-1 148.

Moreover, since the page is merely borrowed in the domain write processing 158, once the consumer or destination has finished with the borrowed page, the previously locked page is then unlocked so that the original owner of the page may again use its contents. The fourth row under the domain-1 148, domain-2 152 and domain-3 156 designated by reference numeral 178 illustrates the end result after the unlocking operation; namely, PAGE_C 174-4 is now again exclusively controlled by domain-3 156.

Thus, it is possible with the invention to receive data from a network I/O subsystem and transfer it to a disk I/O subsystem without ever having to touch the data. With the receipt of data across domains, the remapping operations are able to be deferred until the data is received in a domain that needs to touch the data. In certain cases, the transfer of data can be completed without ever having to map in the data to the receiving domain's address space. With the transmission of data across domains, where possible the pages are borrowed in their physical form.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be

What is claimed is:

1. A computer system, comprising:
    a network adapter that connects to a network, said network adapter including circuitry for performing data checksum operations;
    a computer and an operating system arranged to support multiple processes and multiple domains;
    a main memory having at least a portion thereof arranged in pages; and
    a virtual memory management unit, operatively connected to said computer and said memory, for managing reads and writes to said memory using page mapping information,
    wherein said operating system controls ownership of the pages in said memory using page ownership information,
    wherein said computer system enables the receipt of a physical page of data transferred between domains by reassigning ownership of the physical page within the page ownership information without updating the page mapping information associated with said virtual memory management unit until the domain obtaining ownership needs to read the data, such that burdensome page remapping operations are be avoided or at least deferred until needed,
    wherein the transfer of the page of data is invoked by a data request,
    wherein said operating system comprises means for determining whether the requested page of data being received is one of a virtual address request and a physical page memory request,
    wherein when the requested page is the physical page memory request, said operating system controls the reassigning of ownership of the physical page within the page ownership information without updating the page mapping information, and
    wherein when the requested page is the virtual address request, said operating system controls the reassigning of ownership of the physical page within page ownership information and said operating system together with said virtual memory management unit update the page mapping information.

2. A computer system as recited in claim 1, wherein the page mapping information includes data for translating virtual memory addresses to physical addresses.

3. A computer system as recited in claim 1, wherein said virtual memory management unit comprises a translation mapping device for mapping virtual memory addresses to physical addresses.

4. A computer system as recited in claim 1, wherein said operating system has physical buffers and virtual buffers associated with each of the multiple domains, the physical buffers point to said main memory and the virtual buffers point to virtual memory.

5. A computer system as recited in claim 4, wherein said network adapter receives incoming packets of data, each packet includes a header and data, and
    wherein the header is placed in one of the virtual buffers and the data is placed one or more of the physical buffers.

6. A computer system as recited in claim 1, wherein said computer system enables the transmission of a physical page of data across domains by borrowing the physical page.

7. A computer system as recited in claim 6, wherein said computer system further enables the transmission of the physical page across domains by locking the page ownership information associated with the borrowed page while the physical page is being borrowed.

8. A computer system as recited in claim 7, wherein the original owner of the borrowed page is restricted to read-only access while the physical page is being borrowed.

9. A computer system as recited in claim 6, wherein said operating system has physical buffers and virtual buffers associated with each of the multiple domains, the physical buffers point to said main memory and the virtual buffers point to virtual memory.

10. A computer system as recited in claim 9, wherein said network adapter receives incoming packets of data, each packet includes a header and data, and
    wherein the header is placed in one of the virtual buffers and the data is placed one or more of the physical buffers.

11. In a multitasking computer system supporting multiple domains and virtual memory, a method for transferring a block of data associated with a first domain to a second domain, said method comprising the steps of:
    (a) receiving a request at a first domain from a second domain for a block of data residing on a portion of physical memory assigned to the first domain;
    (b) reassigning ownership of the block of data requested from the first domain to the second domain;
    (c) determining whether the block of data requested is one of a virtual address request and a physical memory request; and
    (d) remapping virtual addresses in accordance with said reassigning step (b) when said determining step (c) determines that the data request is the virtual address request and not when said determining step (c) determines that the data request is the physical memory requests,
    wherein burdensome remapping operations are avoided or at least deferred until said determining step (c) determines that a data request is a virtual address request for the reassigned block of data.

12. A method as recited in claim 11, wherein the physical memory includes a plurality of pages, and the portion of the physical memory storing the block of data is one or more pages of the physical memory.

13. A method as recited in claim 11, wherein the block of data is one or more pages of the physical memory, and the physical memory request is a physical page memory request.

14. A method as recited in claim 13, wherein said reassigning step (b) of ownership comprises flipping the physical page requested at the first domain with a physical page of the second domain.

15. A method as recited in claim 11, wherein the virtual address request is a read request that will need to touch the data, and the physical memory request is a read request that will not need to touch the data.

16. A method as recited in claim 15, wherein said remapping step (d) is deferred until a read request for the data being transferred needs to touch the data.

17. A method as recited in claim 15, wherein the first domain is a network domain and the second domain is a kernal domain.

* * * * *